United States Patent [19]
Grenoble

[11] 3,900,617
[45] Aug. 19, 1975

[54] METHOD OF RENDERING FLEXIBLE SHEET MATERIAL NON-ADHERENT AND ARTICLE PRODUCED THEREBY

[75] Inventor: Maurice E. Grenoble, Ballston Lake, N.Y.

[73] Assignee: General Electric Company, Waterford, N.Y.

[22] Filed: Nov. 27, 1973

[21] Appl. No.: 419,372

[52] U.S. Cl. ............... 427/387; 427/390; 427/391; 260/46.5 G; 260/46.5 UA; 260/825
[51] Int. Cl.$^2$.... B44D 1/22; B44D 1/24; D21H 1/38
[58] Field of Search .. 117/138.8 A, 155 R, 161 ZA; 260/46.5 UA, 46.5 G, 825

[56] References Cited
UNITED STATES PATENTS

| 2,985,545 | 5/1961 | Leavitt | 117/143 |
| 3,383,356 | 5/1968 | Nielsen | 260/46.5 UA |
| 3,814,731 | 6/1974 | Nitzsche et al. | 260/46.5 UA |

*Primary Examiner*—Michael R. Lusignan
*Attorney, Agent, or Firm*—Donald J. Voss; E. Philip Koltos; Edward A. Hedman

[57] ABSTRACT

Sheet materials are rendered non-adherent to various organic solids by treating with an aqueous emulsion containing (i) a vinyl chain-stopped polyorganosiloxane, (ii) an organohydrogenpolysiloxane and (iii) a platinum catalyst and thereafter drying the so-treated sheet materials.

11 Claims, No Drawings

METHOD OF RENDERING FLEXIBLE SHEET MATERIAL NON-ADHERENT AND ARTICLE PRODUCED THEREBY

This invention is concerned with rendering flexible sheet materials non-adherent to various organic solids. More particularly, it is concerned with a process for rendering paper, paperboard, plastics, and the like, non-adherent to normally adherent materials, such as, for example, asphalts, bitumen, tars, waxes, paraffin solids, flour-containing pastes, frozen foodstuffs, and other high molecular weight polymers.

BACKGROUND OF THE INVENTION

Products consisting of reactive polysiloxanes in aqueous emulsion form have been marketed for several years. These compositions are used to coat flexible paper, board or plastic substrates, in the form of sheet material, so that the treated surface will release — without tearing — from normally adhesive materials, e.g., asphalt and rubber latex, as illustrated above. Illustrative such products are described, for example in Leavitt, U.S. Pat. No. 2,985,545, and in deMonterey and Zurlo, U.S. Pat. No. 2,985,544, both of which are assigned to the assignee of the present application and incorporated herein by reference. The conventional products are applied to the flexible sheet material as a water based coating and then dried and cured at relatively high temperatures. In order to obtain maximum cure, a dwell or residence time of one minute, or longer, at a temperature of 300°F., or higher, is often used. One shortcoming with such treatments is that, in porous substrates, e.g., those made with cellulosic fibers, even under ideal conditions, the freshly cured coating will migrate for several hours, thus making the product unacceptable for some applications.

The illustrative products, which are the best available in the current state of the art, normally consist of a silanol-stopped polyorganosiloxane fluid which is cross-linked with a methyl hydrogen polysiloxane or a methyl polysiloxane resin using an organometallic soap as a catalyst, e.g., a tin salt of an organic acid.

It has now been discovered that if the silanol-stopped fluid is replaced with a vinyl-stopped polyorganosiloxane, and the base metal catalyst is replaced by a platinum catalyst, a superior emulsion is obtained which gives a faster, more complete cure.

By way of illustration, after coating onto kraft paper, the new system cure in 20 seconds at 300°F. and in 30 seconds at 250°F. and there is no migration of the cured silicone. In contrast, with one of the best systems of the prior art, there is substantial silicone migration even after 60 seconds of cure at 300°F. These data will be presented hereinafter.

A further, unexpected advantage of the new water based system of the present invention is that water apparently acts as an inhibitor for the platinum catalyzed vinyl / Si — H reaction. The water-free combination reacts within 60 seconds unless an inhibitor, such as acrylonitrile is added. See Chalk, U.S. Pat No. 3,344,111, assigned to the assignee of the present application. With the present systems, emulsification in water appears to preclude any reaction taking place until the water has been removed, e.g., by evaporation.

DESCRIPTION OF THE INVENTION

According to the present invention, in its broadest aspects, there is provided a method for rendering sheet material non-adherent to surfaces which normally adhere thereto, the method comprising:

A. treating the sheet material with an aqueous emulsion treating bath containing
  i. a vinyl chain-stopped polyorganosiloxane;
  ii. an organic hydrogenpolysiloxane and
  iii. a platinum catalyst effective to cause copolymerization of (i) and (ii) and, thereafter;
B. drying the treated material.

The vinyl chain-stopped polysiloxanes employed in the present invention will have units of the following general formula;

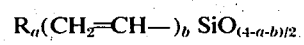

wherein R is a monovalent hydrocarbon radical, $a$ is 0 to 3, $b$ is 0.005 to 2.0 and $a$ plus $b$ is 0.8 to 3.

Preferably, component (i) will be of the formula:

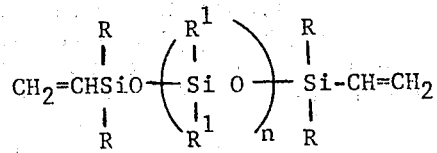

wherein R and $R^1$ are monovalent hydrocarbon radicals free of unsaturation, with at least 50 mole % of the $R^1$ groups being methyl and $n$ has a value sufficient to provide a fluid material having a viscosity of from 100 to 750,000 centistokes at 25°C. More preferably, in component (i), R and $R^1$ are alkyl, e.g., methyl, ethyl, propyl, butyl, octyl, etc., aryl, e.g., phenyl, tolyl, xylyl, etc., cycloalkyl, e.g., cyclohexyl, cycloheptyl, etc., aralkyl, e.g., benzyl, phenylethyl, etc., halogenated aryl, e.g., chlorophenyl, bromophenyl, chloronaphthyl, etc., cyanoalkyl, e.g., cyanoethyl, cyanopropyl, etc., or mixtures of any of the foregoing. Special mention is made of components (i) which are polydimethylsiloxanes having terminal vinyl groups and in which $n$ is between 25 and 100,000. Very useful are linear polysiloxane component (i), which are fluid in form having a viscosity of 400 to 400,000 centistokes at 25°C. Components (i) are described in Chalk, mentioned above, and in Modic, U.S. Pat No. 3,436,366, assigned to the assignee of the present application and incorporated herein by reference. They can be made, for example, by co-hydrolysis of mixtures of vinyldiorganochlorosilanes and diorganodichlorosilanes or by equilibration of cyclic diorganosiloxanes and the vinyldiorganochlorosilane, in accordance with known procedures.

The organic hydrogenpolysiloxane component (ii) can vary rather broadly in structure and it can comprise a mixture of such materials. One characteristic is that it has at least two silicon-bonded hydrogen atoms per molecule. One of the silicon-bonded hydrogen atoms reacts with a silicon-bonded vinyl group in one molecule of component (i) and the second silicon-bonded hydrogen atom reacts with another such silicon-bonded vinyl group to effect cross-linking.

The organohydrogenpolysiloxane will preferably be of the formula:

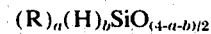

wherein R is as defined above, $a$ is from 0 to 3, preferably from 1.0 to 2.10, $b$ is from 0.005 to 2.0, preferably from 0.1 to 1.0 and the sum of $a$ plus $b$ is from 0.8 to 3, preferably 2.0 to 2.67. Component (ii) can be linear, cyclic or resinous in nature, but preferably is linear or resinous. One illustrative material is a linear dimethylhydrogen chain-stopped dimethylpolysiloxane containing from 2 to 3 silicon atoms in the molecule. A further specific component (ii) is a resinous copolymer of dimethylsiloxane units, methylhydrogensiloxane units and trimethylsiloxane units which contains from 2 to 5 or 10 or more silicon atoms per molecule. Also illustrative are 1,3,5,7-tetramethylcyclotetrasiloxane; a copolymer containing three dimethylhydrogensiloxane units and one monomethylsiloxane unit per molecule; and a low viscosity fluid composed of dimethylhydrogensiloxane units and $SiO_2$ units in the ratio of 2 moles of the former to 1 mole of the latter. Especially useful is a linear methylhydrogenpolysiloxane fluid or a resinous methylhydrogenpolysiloxane. Such components are well known to those skilled in this art and are described in the above-mentioned Modic patent. Wilcox, U.S. Pat. No. 2,491,843 describes especially useful family of linear trimethylsilyl chain-stopped polysiloxanes. One is made by cohydrolyzing 5 parts of $(CH_3)_3$—SiCl and 95 parts of $CH_3HSiCl_2$; viscosity 100 cps. at 25°C.

The platinum catalyst component (iii) employed in the present invention can be any of the well known platinum catalysts which are effective for catalyzing the reaction between silicon-bonded hydrogen groups and silicon-bonded vinyl groups. These materials include the various finely divided elemental platinum catalysts, such as those described in Bailey, U.S. Pat. No. 2,970,150, the chloroplatinic acid catalysts described in Speier, U.S. Pat. No. 2,823,218, the platinum-hydrocarbon complexes described in Ashby, U.S. Pat. Nos. 3,159,601 and 3,139,662, as well as the platinum alcoholate catalysts disclosed in Lamoreaux, U.S. Pat. No. 3,220,972. Regardless of the type of platinum catalyst employed, the catalyst is used in an amount sufficient to provide from about $10^{-3}$ to $10^{-6}$ gram atoms of platinum per mole of silicon-bonded vinyl groups in the composition. On another basis, a useful range of catalyst will provide one platinum atom for each 100 to one million silicon-bonded vinyl groups in component (i). Especially preferably, the platinum catalyst will be present in an amount sufficient to provide from 5 to 50 parts per million of platinum based on the weight of vinyl chain-stopped polyorganosiloxane component (i).

While the emulsions of the present process can be prepared by merely mixing the various components together in any desired fashion, it is often best to prepare the compositions as two separate emulsions which are then combined into a coating bath aqueous emulsion shortly before applying to the flexible sheet material. In case of the "two emulsion technique", it is convenient to include in the first the vinyl chain-stopped polysiloxane component (i) and the platinum catalyst component (iii). The second emulsion will contain as its sole active ingredient the emulsified organohydrogenpolysiloxane component (ii). Obviously, the relative proportions of the two emulsions required to produce the composition of the present invention can be easily controlled. Generally, the distribution of the components between the two emulsions is such that from 0.05 to 1 part by weight of the second emulsion is employed per part by weight of the first. In any event, in making two emulsions for later combination, it is best not to include both the platinum catalyst component (iii) and the organohydrogenpolysiloxane component (ii) in the same emulsion.

The above essential ingredients used for treating flexible sheet materials to render them releasible in the form of a coating material which is non-migratory as far as the organopolysiloxane contained therein are concerned, will be employed in the form of an aqueous emulsion (with or without solvent contained therein). Such baths can be used to treat sheet materials, e.g., plastics or cellulosic materials such as parchment paper, kraft paper, linen rag paper, rice paper, glassine, cellophane, sulfite cellulose paper, polyethylene paper, polyacetate paper, and the like; as well as sheeting or boxing materials such as paperboard, cardboard, pulpboard, and pasteboard.

The aqueous emulsion employed in the practice of the present invention most advantageously comprises, on a weight basis, the following:

| | | |
|---|---|---|
| (i) | linear polydimethylsiloxane containing terminal vinyl groups | 1 to 50% |
| (ii) | methylhydrogenpolysiloxane | 0.01 to 5% |
| (iii) | platinum in the form of a salt or a complex | 0.00001 to 0.0005% |
| (iv) | water | 65 to 98% |
| (v) | emulsifying agent | an effective amount, e.g., 0.1 to 3% based on the weight of the entire treating emulsion. |

The amount of platinum catalyst within the preferred range will obviously depend upon such factors as, for instance, the type of siloxane resin and the hydride curing agent employed, the type of sheet material to which the treating composition will be applied, as well as the medium in which the platinum catalyst will be used, the treating conditions including temperature and time of treatment, etc. These will be optimized by those skilled in this art, using the working examples to follow as points of departure.

The actual amount of emulsifying or dispersing agent employed and the chemical nature thereof can vary, but will depend, for instance, upon the type of ingredients present in the treating composition, the application intended, etc. Generally, the amount of emulsifying agent satisfactorily employed may range from about 0.1 to 3%, by weight, based on the weight of the entire aqueous treating emulsion. The amount used is not critical and persons skilled in the art will have little difficulty in determining readily the amount which gives optimum results. It is preferable that the emulsifying agent used be one which permits the emulsion to be stable under treating conditions but is readily broken in contact with the flexible sheet material to deposit the organopolysiloxane. Suitable emulsifying agents will be anionic, nonionic and cationic. Especially suitable are polymeric non-ionic materials, such as polyvinyl alcohol (e.g., DuPont's Elvanol 50–42) made by partially hydrolyzing polyvinyl acetate (86–89% hydrolyzed).

Especially suitable are alkyl ethers - or alkylphenylethers of polyalkylene glycols, e.g., a trimethylnonyl ether of polyethylene glycol (Union Carbide's Tergitol TMN) or an alkylphenyl ether of polyethylene glycol (Union Carbide's Tergitol NP-40) or mixtures thereof.

One method for making the emulsion type treating compositions herein described comprises, first, dissolving the emulsifying agent, e.g., an alkylether of an alkylene glycol in water, and then adding slowly the vinyl chain-stopped polydiorganosiloxane and platinum catalyst. This mixture of ingredients is thoroughly homogenized (or colloided) until the polyvinyl chain-stopped siloxane and the catalyst are intimately dispersed throughout the water phase. A second aqueous emulsion is prepared using for example, an alkyl ether of a polyalkylene glycol as an emulsifying agent and the organohydrogensiloxane component similarly as above. This second mixture is also homogenized to form an emulsion and in this form is added to the first emulsion with the desired amount of water to prepare the treating bath.

The procedure described above for preparing aqueous emulsions of the treating compositions herein described may, of course, be varied within limits and it is not intended that the description be limiting in any manner. The presence of small amounts of organic solvents is not precluded, and, under some circumstances, may be desirable to promote homogeneity and facilitate application, especially to plastic substrates. If any organic solvent is employed, it is preferable that one be employed which is easily volatized at the temperature at which treatment of the flexible sheet material will take place. All of the emulsions should be kept at a relatively cool temperature, e.g., around room temperature, prior to use in order to maintain stability; freezing must be avoided.

The treating bath can be applied to the sheets by any convenient means, for instance, with conventional dip or roller coating equipment, or by padding, spraying, knife-coating, etc.; alternatively, the emulsion may be applied by means of a size press employed in combination with a cellulosic paper machine so that the treatment of the flexible sheet material is on a continuous basis taking place after the paper is formed on, for instance, a Fourdrinier machine.

Following the treatment of the flexible sheet material with the emulsion or emulsion-dispersion, the material is advantageously dried by passing the treated material over heated rolls (or "cans") maintained at temperatures of about 190°F. to 350°F. for from about 10 seconds to 3 minutes or more. The use of circulating hot air at temperatures of from 200°F. to 325°F. may also be used for times of from 10 seconds to 5 minutes to effect curing of the treated sheet material. This drying step will bring out the optimum release properties of the sheet material without further heat treatment. Of equal significance is the fact that these optimum release properties are immediately available without requiring aging or storage of the treated sheet material. Obviously, the higher the temperature, the shorter the period of exposure of the sheet material for removing the water and drying thereof. Temperatures so high as to cause degradation of the sheet material itself will, of course, be avoided.

DESCRIPTION OF THE PREFERRED EMBODIMENTS.

The following examples illustrate the process of the present invention. They are illustrative and the claims are not to be construed as limited thereto.

EXAMPLE 1

A first emulsion is prepared by mixing together on a weight basis the following components, diluting with water, and passing through a colloidal mill to obtain a homogeneous creamy emulsion.

| Emulsion A | parts by weight |
| --- | --- |
| vinyl chain-stopped dimethyl-polysiloxane fluid, 4,000 centistokes viscosity at 25°C. | 40.0 |
| platinum catalyst (5% platinum content of a solution of chloroplatinic acid in n-butanol) | 0.008 |
| emulsifier* (Tergitol TMN) | 1.275 |
| (Tergitol NP-40) | 1.275 |
| water | 52.442 |

*Tergitol-TMN is a product of Union Carbide Corporation and comprises a trimethylnonyl ether of polyethylene glycol. Tergitol-NP-40 is a product of Union Carbide Corporation and comprises an alkyl phenyl ether of polyethylene glycol.

The amount of platinum is 10 parts per million based on the vinyl chain-stopped fluid.

A second emulsion is prepared as described, comprising the following components:

| Emulsion B | parts by weight |
| --- | --- |
| methylhydrogenpolysiloxane | 40.0 |
| emulsifier (Tergitol TMN) | 1.275 |
| (Tergitol NP-40) | 1.275 |
| water | 57.45 |

A treating bath composition is prepared by combining Emulsions A and B into the following formulation and adding water and a small amount of hydroxyethyl cellulose to retard migration into the substrate;

| Treating Bath | parts by weight |
| --- | --- |
| Emulsion A | 12.5 |
| Emulsion B | 1.25 |
| hydroxyethylcellulose (Natrosol 250HR)* | 0.5 |
| water | 85.75 |

*Hercules Powder Co., Inc.

Forty-pound supercalendered kraft is surface coated with a metering rod in the treating bath to provide a deposition of about 0.5 lbs. of silicone per 3,000 ft.$^2$. The paper is then cured at 300°F. for 20 seconds. Other portions are cured at 250°F. for 30 seconds. The cured sheets are checked for migration of uncured silicone. No migration is detected.

EXAMPLE 2

The procedure of Example 1 is repeated, and the cured paper sheets are overcoated on one face with a "wet" styrene-butadiene rubbery copolymer adhesive. The adhesive layer is air dried at 75°F. for 10 minutes, then heated at 175°F. for 10 minutes. The sheet is then laminated with label face stock and the release properties are measured. At 400 inches/minute, the release is 50 g./inch of width. This is entirely acceptable for commercial use.

EXAMPLE 3

The procedure of Example 1 is repeated, substituting a hydride-containing methyl silicone resin for the linear methylhydrogenpolysiloxane in Emulsion B and coating paper with the bath emulsion. The paper is cured both at 300°F. for 20 seconds and at 250°F. for 30 seconds. In neither case was any migration of the silicone observed.

COMPARATIVE EXAMPLE A

A coating bath similar to that described in Example 1 is prepared, except that the vinyl-terminated polydimethylsiloxane is replaced with a hydroxy-terminated polydimethylsiloxane, and the platinum catalyst is replaced with a mixture of zinc octoate-dibutyltin dioctoate. Paper is coated with the composition and is cured at 250°F. and at 300°F. Excessive migration of the silicone is observed even after curing for 60 seconds.

It will be obvious that the amounts of ingredients in Emulsion A, Emulsion B and in the treating bath emulsion may be varied pursuant to the modifications and variations defined in the preceding examples.

By way of illustration, instead of the vinyl-stopped polysiloxane recited, other vinyl-terminated polysiloxanes with viscosities within the range of 100 to 750,000 centistokes at 25°C. can be used. Higher viscosities are preferred since release properties improve with an increase in the molecular weight of the chain. The concentration of the vinyl-stopped polyorganosiloxane, the hydride, the type of hydride used, the concentration of the catalyst, emulsifying agent, etc., may also vary within the ranges previously disclosed. The concentration and nature of the platinum catalyst may also be varied.

Those skilled in this art will be well aware that the amount of organopolysiloxane which is picked up by the flexible sheet material as a result of the treatment with the emulsion of the organopolysiloxane depends upon such factors as the absorbency of the sheet material, the method of application, the concentration of organopolysiloxanes in the emulsion, etc. Generally, however, the amount of organopolysiloxane pickup will range from abour 0.1 to about 5%, or more, if a cellulosic material is used; the preferred pickup being within the range of about 0.4 to 2% organopolysiloxane. Obviously, larger amounts of organopolysiloxane pickup may be employed, but generally this is not useful in the sense that high pickups tend to increase the cost of the treatment unnecessarily.

Advantages of using the compositions hereindescribed for the above specified purposes are manifold. Of primary importance is the fact that when the above combination of ingredients is applied to porous substrates, such as, paper, in addition to imparting the release characteristics thereto, the organopolysiloxane content in the porous substrate is substantially non-migratory and will not affect or be transferred to the surfaces of other compositions from which the strippable flexible sheet material must be readily separated.

The present invention obviates another serious problem which has existed in the past. Heretofore, it was believed that methylhydrogenpolysiloxanes were an essential ingredient to treat paper to render the latter releasible; see, Dennett, U.S. Pat. No. 2,588,367. However, methylhydrogenpolysiloxanes tended to gas due to the presence of silicon-bonded hydrogen and this posed a serious safety and toxicity problem. In addition, the loss of hydrogen from the methylhydrogenpolysiloxane as a result of the gassing of the latter markedly reduced not only the bath life or the storage stability of the emulsion, even before a catalyst was added, but, more seriously, reduced the bath life of any treating emulsion containing both the methylhydrogenpolysiloxane and the catalyst. Because of this instability of the methylpolysiloxane in the treating bath, it tended to form rubbery and resinous layers in the treating equipment used to treat paper, particularly in the nip between the rolls which are often used to squeeze out excess treating emulsions. Attempts to reduce this formation of rubbery or resinous coatings by lowering the catalyst level resulted in incomplete curing of the silicone polymer on the paper thus increasing to a marked extent the migration of the silicone from the paper to any objects with which it came in contact; in addition this reduction in catalyst level also resulted in poor release characteristics due to the incomplete cure. Such problems are not encountered in the new process of this invention.

The compositions for treating flexible sheet materials as hereindescribed are readily amenable to a singlestep procedure and are easily regulated and controlled for adjustable organopolysiloxane pickup by minor variations in formulations. Standard paper making or paper converting equipment is readily employed in connection with the treating operations and no precautions need to be taken for any toxic materials which may be contained in the treating emulsions.

Flexible sheet materials treated as described herein have a wide range of usefulness. Thus, asphalt or high molecular weight organic polymers, such as various snythetic rubbers, can be poured hot into containers fashioned from the treated sheets in the form of paper or paperboard, and after cooling it will be found that solidified asphalt or polymer is readily and cleanly separated from container walls.

Moreover, the sheet material treated in accordance with the process of this invention may be substituted for various materials which have heretofore been used in contact with adhesive surfaces of electrican's pressure sensitive tape, adhesive tapes used for surgical purposes, regenerated cellulose tapes carrying a permanent adhesive upon one surface, and the like. Moreover, vulcanized or unvulcanized sheets of rubber can be interleaved with sheets prepared by the instant process and prevented from adhering to each other despite the fact that these sheets of rubber are quite sticky and cohesive when in direct contact with each other. Flexible sheet material treated in accordance with the instant invention is also useful in lining various boxes of partially prebaked goods, such as buns, rolls and the like to prevent sticking, and advantage can then be taken of the outstanding release properties at elevated temperatures by completing the baking cycle in the original container in which the baked goods are purchased.

Obviously, many variations will suggest themselves to those skilled in the art from the above detailed description without departing from the scope or spirit of the invention. The invention is particularly described by the appended claims.

I claim:
1. A process for rendering flexible sheet material non-adherent to surfaces which normally adhere thereto, which process comprises:
A. treating the sheet material with an aqueous emulsion treating bath containing
   i. from 1 to 50% by weight of a vinyl chain-stopped polysiloxane having the formula:

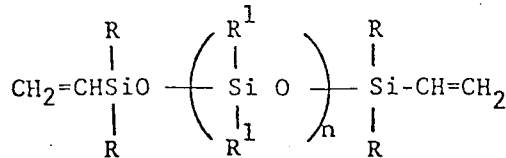

wherein R and $R^1$ are monovalent hydrocarbon radicals free of unsaturation, with at least 50 mole % of the $R^1$ groups being methyl and $n$ has a value sufficient to provide a fluid material having a viscosity of from 100 to 750,000 centistokes at 25°C.;
   ii. an organic hydrogen-polysiloxane having the formula:

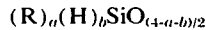

wherein R is as defined above, $a$ is from 0 to 3, $b$ is from 0.005 to 2.0 and the sum of $a$ plus $b$ is from about 0.8 to 3, there being at least two silicon-bonded hydrogen atoms per molecule; and
   iii. a platinum catalyst effective to cause copolymerization of (i) and (ii), and, thereafter,
B. drying the treated material.
2. A process as defined in claim 1 wherein R and $R^1$ are alkyl, aryl, aralkyl, halogenated aryl, cyanoalkyl, cycloalkyl or a mixture thereof.
3. A process as defined in claim 1 wherein said linear polysiloxane component (i) is a polydimethylsiloxane having terminal vinyl groups and in which n is between 25 and 100,000.
4. A process as defined in claim 3 wherein said linear polysiloxane component (i) is a fluid having a viscosity in the range of 400 to 400,000 centistokes at 25°C.
5. A process as defined in claim 1 wherein said hydrogenpolysiloxane component (ii) is a linear methylhydrogenpolysiloxane.
6. A process as defined in claim 1 wherein said hydrogenpolysiloxane component (ii) is a resinous methylhydrogenpolysiloxane.
7. A process as defined in claim 1 wherein the platinum catalyst is present in an amount to provide one platinum atom per 100 to 1,000,000 silicon-bonded vinyl groups in polyorganosiloxane component (i).
8. A process as defined in claim 3 wherein the platinum catalyst is present in an amount to provide from 5 to 50 parts per million of platinum based on the weight of said polyorganosiloxane component (i).
9. A process as defined in claim 1 wherein said aqueous emulsion treating bath comprises:
   i. from 1 to 50% by weight of a linear polydimethylsiloxane containing terminal vinyl groups;
   ii. from 0.01 to 5% by weight of a methylhydrogenpolysiloxane;
   iii. from 0.00001 to 0.0005% by weight of platinum in the form of a salt or complex;
   iv. from 65 to 98% by weight by water; and
   v. an emulsifying agent or a mixture of such agents in an amount effective to provide a stable emulsion of (i), (ii) and (iii) in water, all percentages being by weight.
10. Flexible sheet material treated in accordance with the process described in claim 1.
11. Flexible sheet material treated in accordance with the process described in claim 9.

* * * * *